United States Patent
Ida et al.

[11] Patent Number: 5,892,590
[45] Date of Patent: Apr. 6, 1999

[54] CORRECTED DATA GENERATOR FOR IMAGE TAKING DEVICE

[75] Inventors: Yoshihiro Ida; Ichiroh Ogawa, both of Yokohama; Nobuo Kamanaka, Tokyo; Yoshikazu Naitoh, Fujisawa; Takahiro Sugawara, Yokohama, all of Japan

[73] Assignee: Matsushita Electric Industrial Co., Ltd., Osaka, Japan

[21] Appl. No.: 509,068

[22] Filed: Jul. 31, 1995

Related U.S. Application Data

[63] Continuation of Ser. No. 251,439, May 31, 1994, abandoned.

[30] Foreign Application Priority Data

May 31, 1993 [JP] Japan .................................. 5-129104

[51] Int. Cl.⁶ ........................................................ H04N 1/00
[52] U.S. Cl. ............................ 358/406; 358/461; 358/474
[58] Field of Search ................................. 358/400, 401, 358/406, 461, 462, 464, 474; 382/299

[56] References Cited

U.S. PATENT DOCUMENTS

| | | | |
|---|---|---|---|
| 4,427,998 | 1/1984 | Huntoon | 358/406 |
| 4,641,357 | 2/1987 | Satoh | 358/483 |
| 4,751,376 | 6/1988 | Sugiura et al. | 358/406 |
| 4,779,106 | 10/1988 | Mills | 358/406 |
| 5,282,060 | 1/1994 | Kizu et al. | 358/461 |
| 5,307,175 | 4/1994 | Seachman | 358/401 |

FOREIGN PATENT DOCUMENTS

| | | |
|---|---|---|
| 194776 | 4/1989 | Japan . |
| 1119178 | 5/1989 | Japan . |

Primary Examiner—Thomas D. Lee
Attorney, Agent, or Firm—Lowe, Price, LeBlanc & Becker

[57] ABSTRACT

A corrected data generator for an image taking device includes a training plate having a reference pattern. A memory stores predetermined image information corresponding to the reference pattern on the training plate. A photoelectric section converts a light signal into a corresponding electric signal. Corrective information is generated in response to an electric signal of the reference pattern which is outputted from the photoelectric section, and in response to the image information stored in the memory. An electric signal of an object which is outputted from the photoelectric section is corrected in response to the corrective information.

10 Claims, 8 Drawing Sheets

SUB SCANNING
DIRECTION

CORRECTED DATA GENERATOR FOR IMAGE TAKING DEVICE

This application is a continuation of application Ser. No. 08/251,439 filed May 31, 1997, now abandoned.

BACKGROUND OF THE INVENTION

1. Field of the Invention

This invention relates to a corrected data generator for an image taking device such as an image scanner.

2. Description of the Prior Art

An image taking device such as an image scanner or a video camera includes an optical system and a photoelectric section. An image of an object is formed on the photoelectric section via the optical system. The image on the photoelectric section is converted into a corresponding electric signal by the photoelectric section. Generally, the optical system has aberrations of various types. Accordingly, the image on the photoelectric section is distorted by the aberrations of the optical system.

Japanese published unexamined patent application 1-94776 discloses a video camera having a photoelectric section composed of a two-dimensional array of pixel-corresponding segments. In Japanese application 1-94776, the area of a pixel-corresponding segment increases as the position of the segment moves from the center toward an edge of the photoelectric section. This design compensates for a distortion of an image on the photoelectric section which is caused by a certain aberration of an optical system.

Japanese published unexamined patent application 1-119178 discloses an image sensor having a two-dimensional array of photosensitive elements. In Japanese application 1-119178, the pitch between photosensitive elements varies as a region containing the photosensitive elements moves from the center toward an edge of the photosensitive element array. This design compensates for a distortion of an image on the photosensitive element array which is caused by a distortion of an optical system.

SUMMARY OF THE INVENTION

It is an object of this invention to provide a corrected data generator for an image taking device which is effective to compensate for a distortion of an image and a variation in characteristics between photosensitive elements.

A first aspect of this invention provides a corrected data generator comprising a training plate having a reference pattern; a memory storing predetermined image information corresponding to the reference pattern on the training plate; means for converting a light signal into a corresponding electric signal; means for generating corrective information in response to an electric signal of the reference pattern which is generated by the converting means, and in response to the image information stored in the memory; and means for correcting an electric signal of an object which is generated by the converting means in response to the corrective information generated by the generating means.

A second aspect of this invention provides an apparatus comprising a member having a predetermined reference pattern; an image sensor for converting an image of the reference pattern into a reference electric signal, and for converting an image of an object into an object electric signal; a memory storing a predetermined electric signal representing an ideal image of the reference pattern; and means for comparing the reference electric signal and the predetermined electric signal; and means for correcting the object electric signal in response to a result of the comparing by the comparing means.

A third aspect of this invention provides an apparatus comprising a member having a predetermined reference pattern; an image sensor for converting an image of the reference pattern into a reference electric signal, and for converting an image of an object into an object electric signal; a memory storing a predetermined electric signal representing an ideal image of the reference pattern; means for generating a corrective electric signal in response to the reference electric signal and the predetermined electric signal; and means for correcting the object electric signal in response to the corrective electric signal.

DESCRIPTION OF THE FIRST PREFERRED EMBODIMENT

Figure 1:
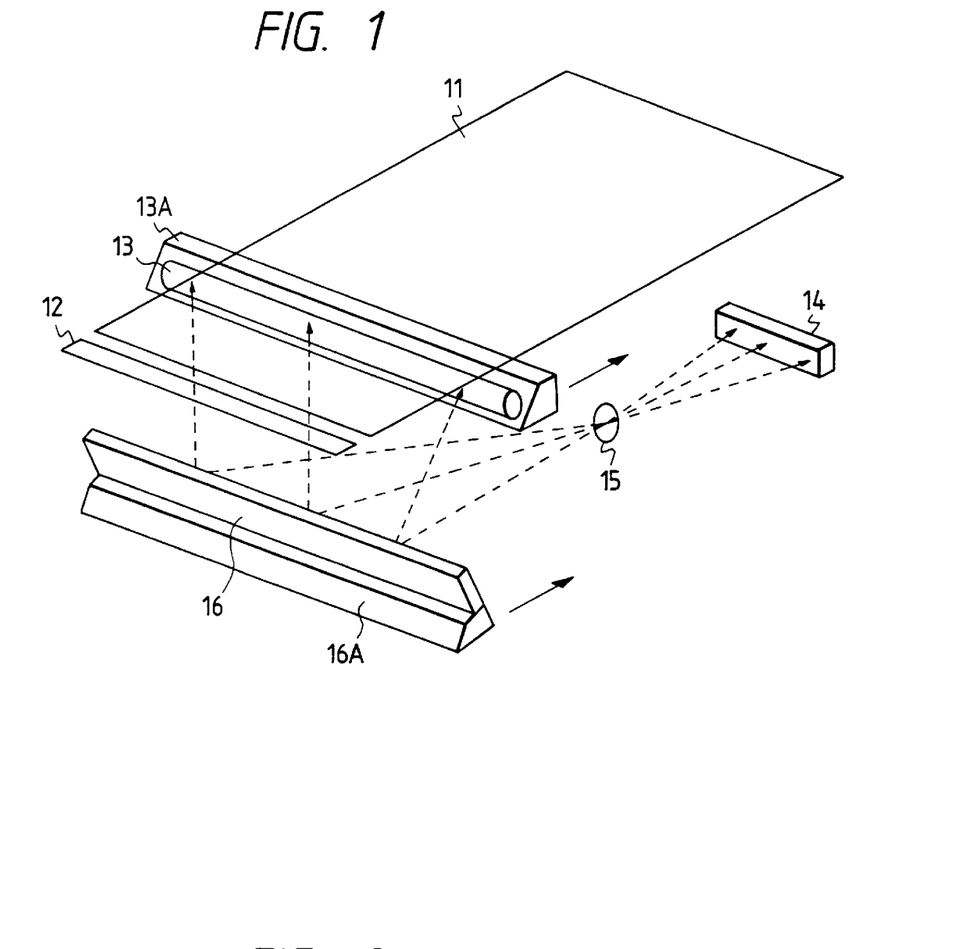
FIG. 1 is a perspective diagram of an image scanner according to a first embodiment of this invention.

With reference to FIG. 1, an image scanner includes a light source 13, an image sensor 14, a lens 15, and a mirror 16. The image scanner serves to convert an image of a surface of a training plate 12 and an image of a surface of a document 11 into a corresponding electric signal. The document 11 has a standard rectangular shape. The training plate 12 and the document 11 are placed on a common flat plane. The training plate 12 has a rectangular elongate shape, and extends parallel with the document 11. The training plate 12 and the document 11 have equal dimensions along the width of the document 11. The training plate 12 is spaced from an edge (a side) of the document 11 by a uniform interval. As will be described later, the training plate 12 has a predetermined reference pattern.

The light source 13, the lens 15, and the mirror 16 compose an optical system in the image scanner. The image sensor 14 forms a photoelectric section of the image scanner.

The light source 13 includes a fluorescent lamp. The light source 13 extends along the width of the document 11 and illuminates a linear region of the document 11 or the training plate 12. Light reflected from the illuminated region of the document 11 or the training plate 12 travels to the mirror 16, being reflected thereby before reaching the image sensor 14 via the lens 15. A reduced image of the illuminated region of the document 11 or the training plate 12 is formed on the image sensor 14.

The light source 13 is supported by a drive member 13A. The mirror 16 is supported by a drive member 16A. The image sensor 14 and the lens 15 are supported on drive members (not shown). The light source 13, the image sensor 14, the lens 15, and the mirror 16 are moved relative to the document 11 and the training plate 12 in a longitudinal direction of the document 11 by a sub scanning mechanism including the drive members 13A and 16A. This movement enables the document 11 and the training plate 12 to be scanned in a sub scanning direction.

Figure 2:
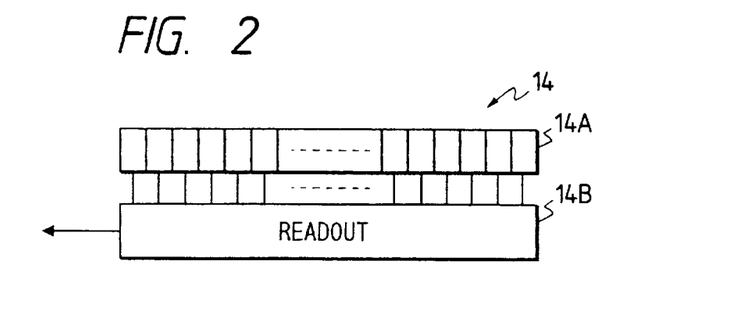
FIG. 2 is a diagram of an image sensor in FIG. 1.

As shown in FIG. 2, the image sensor 14 includes a linear array 14A of photosensitive diodes (photosensitive elements) and a signal readout section (a signal transfer section) 14B electrically connected to the photodiode array 14A. The photodiode array 14A has a length corresponding to the width or the horizontal dimension of the image of the document 11 or the training plate 12. The image of the illuminated region of the document 11 or the training plate 12 on the photodiode array 14A is converted into a corresponding electric signal which is transmitted from the photosensitive element array 14A to an external circuit via the signal readout section 14B. The photosensitive diodes in the array 14A correspond to pixels respectively. Pixel-corresponding electric signals generated by the respective photodiodes are sequentially transmitted therefrom. This signal transmission provides a main scanning process. The main scanning process is executed each time the sub scanning process advances by one step. As a result, the entire areas of the training plate 12 and the document 11 are scanned line by line. The image sensor 14 can be a CCD linear image sensor.

Figure 3:
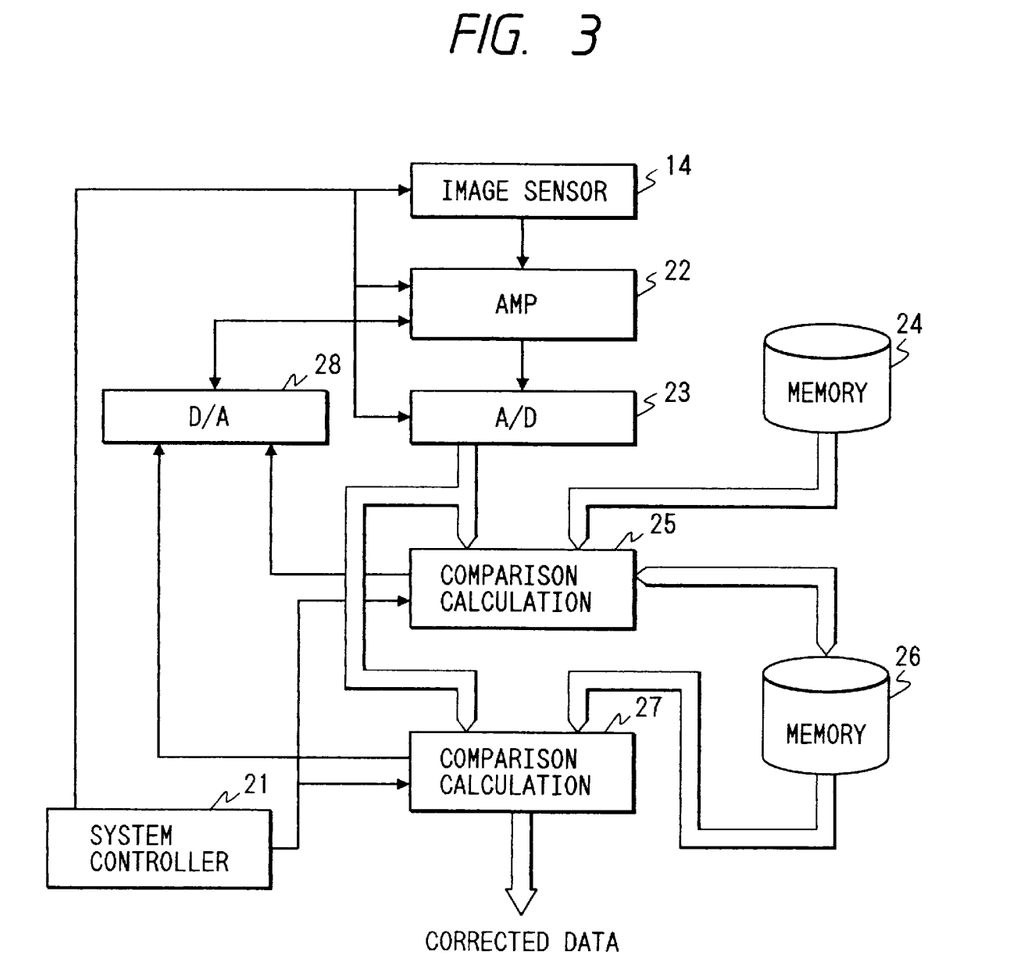
FIG. 3 is a block diagram of the image sensor and a signal processing section of the image scanner in FIG. 1.

As shown in FIG. 3, the image sensor 14 is successively followed by an amplifier 22 and an A/D converter 23. The amplifier 22 includes an operational amplifier. The gain of the amplifier 22 is variable. The output signal from the image sensor 14 which represents the image formed thereon is enlarged by the amplifier 22 before being converted by the A/D converter 23 into a corresponding digital signal (data). Since the data generated by the A/D converter 23 results from detection of the image, the data is referred to as detection data. Time segments of the output signal from the image sensor 14 represent, for example, the brightnesses (tones) of pixel-corresponding segments of the image. The A/D converter 23 is designed so that the value represented by its output digital signal will increase as the brightness of the pixel-corresponding segment of the image increases.

A memory 24 stores reference data representing theoretical values or predetermined reference values corresponding to (corresponding to an ideal image of) the reference pattern on the training plate 12. A comparison/calculation circuit 25 is connected to the A/D converter 23 and the memory 24. The comparison/calculation circuit 25 receives the detection data from the A/D converter 23. The comparison/calculation circuit 25 fetches the theoretical value data from the memory 24. The comparison/calculation circuit 25 compares the detection data and the theoretical value data, and generates information of a data correcting function in response to the comparison result. The comparison/calculation circuit 25 is connected to a memory 26. The comparison/calculation circuit 25 stores the information of the data correcting function into the memory 26.

The comparison/calculation circuit 25 includes, for example, a digital signal processor or a similar device having a combination of an I/O port, a processing section, a ROM, and a RAM. The comparison/calculation circuit 25 can operate in accordance with a program in the ROM.

A comparison/calculation circuit 27 is connected to the A/D converter 23 and the memory 26. The comparison/calculation circuit 27 receives the detection data from the A/D converter 23. The comparison/calculation circuit 27 fetches the information of the data correcting function from the memory 26. The comparison/calculation circuit 27 processes the detection data into corrected data (correction-resultant data) according to calculation determined by the data correcting function. In other words, the comparison/calculation circuit 27 corrects the detection data in response to the data correcting function.

The comparison/calculation circuit 27 includes, for example, a digital signal processor or a similar device having a combination of an I/O port, a processing section, a ROM, and a RAM. The comparison/calculation circuit 27 can operate in accordance with a program in the ROM.

A D/A converter 28 is connected to the amplifier 22, the comparison/calculation circuit 25, and the comparison/calculation circuit 27. An output digital signal from the comparison/calculation circuit 25 or 27 is converted into a corresponding, analog control signal by the D/A converter 28. The D/A converter 28 outputs the control signal to the amplifier 22. The gain of the amplifier 22 is adjusted in response to the control signal.

A system controller 21 is connected to the image sensor 14, the amplifier 22, the A/D converter 23, the comparison/calculation circuit 25, and the comparison/calculation circuit 27. The system controller 21 includes, for example, a microcomputer or a digital signal processor having a combination of an I/O port, a processing section, a ROM, and a RAM. The system controller 21 operates in accordance with a program in the ROM.

The system controller 21 is programmed to control the image scanner. Specifically, the system controller 21 controls start of the optical system in the image scanner which includes the light source 13. The system controller 21 controls the sub scanning mechanism. The system controller 21 controls the image sensor 14, the amplifier 22, the A/D converter 23, the comparison/calculation circuit 25, and the comparison/calculation circuit 27. The system controller 21 manages the memories 24 and 26 via the comparison/calculation circuits 25 and 27. The system controller 21 controls the outputting of corrected data from the comparison/calculation circuit 27.

Figure 8:
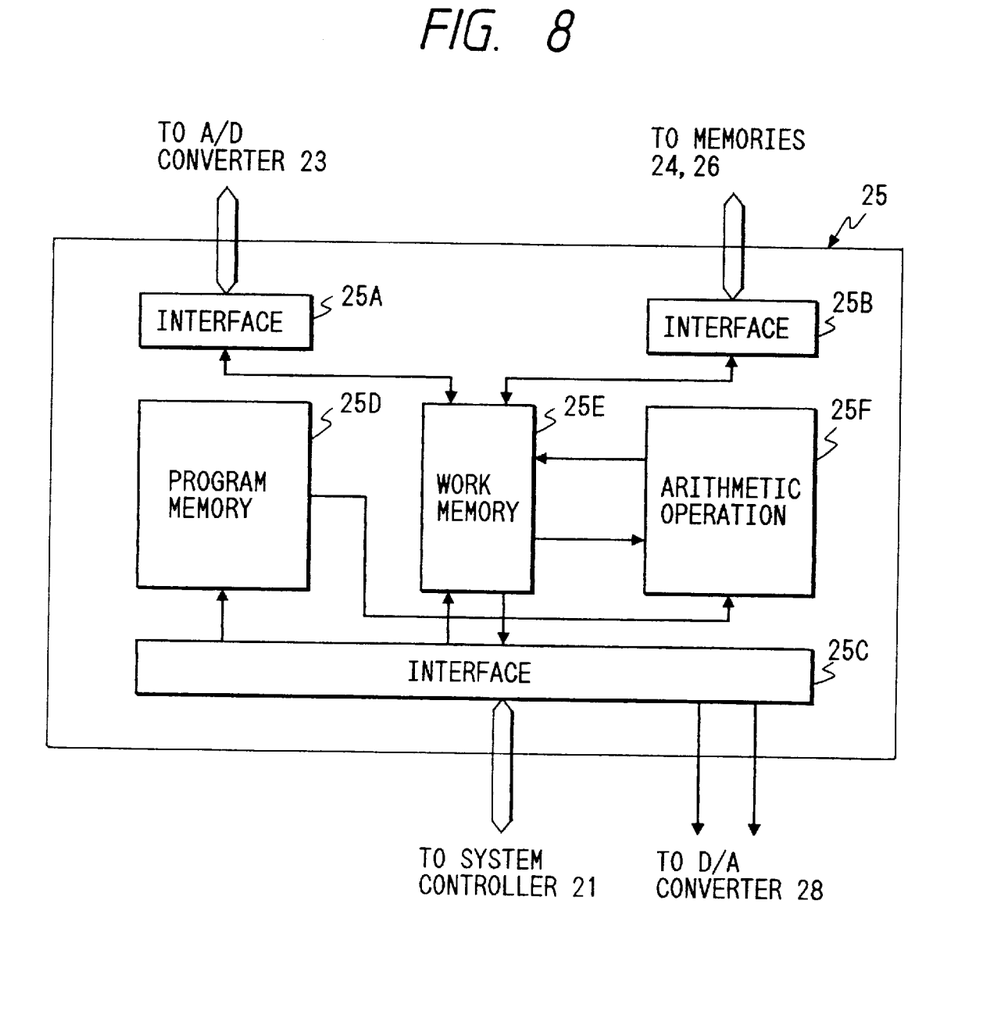
FIG. 8 is a block diagram of the comparison/calculation circuit in FIG. 3.

FIG. 8 shows an example of the structure of the comparison/calculation circuit 25. As shown in FIG. 8, the comparison/calculation circuit 25 includes interface circuits 25A, 25B, 25C, memories 25D, 25E, and an arithmetic operation circuit 25F. The memory 25E is connected to the A/D converter 23 (see FIG. 3) via the interface circuit 25A. The memory 25E is connected to the memories 24 and 26 (see FIG. 3) via the interface 25B. The arithmetic operation circuit 25F is connected to the memories 25D and 25E. The memories 25D and 25E are connected to the interface circuit 25C. The interface circuit 25C is connected to the system controller 21 (see FIG. 3) and the D/A converter 28 (see FIG. 3). The memory 25D stores a program. Thus, the memory 25D serves as a program memory. The arithmetic operation circuit 25F is controlled in accordance with the program in the memory 25D. The memory 25E includes a RAM, and serves as a work memory.

The comparison/calculation circuit 27 is basically similar in internal design to the comparison/calculation circuit 25 of FIG. 8 except that corrected data (correction-resultant data) can be outputted from an interface circuit 25C.

The image scanner operates in either a preliminary mode and a document image reading mode (a document image detecting mode). The system controller 21 changes the operation of the image scanner between the preliminary mode and the document image reading mode. The preliminary mode of operation is executed before the document image reading mode of operation.

During the preliminary mode of operation, the training plate 12 is scanned by the image scanner so that an image of the reference pattern on the training plate 12 is read and detected via the image sensor 14. During the preliminary mode of operation, the system controller 21 activates the image sensor 14, the amplifier 22, the A/D converter 23, and the comparison/calculation circuit 25. The image sensor 14 converts the image of the reference pattern into a corresponding electric signal. The output signal from the image sensor 14 which represents the image of the reference pattern is enlarged by the amplifier 22 before being converted by the A/D converter 23 into a corresponding digital signal (detection data). The output data from the A/D converter 23 which represents the image of the reference pattern has unwanted distortion components corresponding to a distortion of the optical system and a variation in characteristics (for example, sensitivities) between the photosensitive elements in the image sensor 14.

In general, the distortion of the optical system causes equal area segments of an illuminated portion of the training plate 12 or the document 11 to be projected onto regions of the image sensor 14 which have different sizes. Specifically, the size of a region tends to increase as the region moves from the center toward an edge of the image sensor 14. Thus, the brightness of a region tends to decrease as the region moves from the center toward an edge of the image sensor 14.

During the preliminary mode of operation, the comparison/calculation circuit 25 receives the detection data from the A/D converter 23. The comparison/calculation circuit 25 fetches the theoretical value data from the memory 24. The comparison/calculation circuit 25 compares the detection data and the theoretical value data pixel by pixel, and generates information of a data correcting function in response to the comparison result. Basically, the data correction function corresponds to pixel-corresponding differences between the detection data and the theoretical value data which reflect the distortion components of the detection data. The comparison/calculation circuit 25 stores the information of the data correcting function into the memory 26.

After the preliminary mode of operation has been completed, the system controller 21 starts the document image reading mode of operation.

During the document image reading mode of operation, the document 11 is scanned by the image scanner so that an image of the document 11 is read and detected via the image sensor 14.

During the document image reading mode of operation, the system controller 21 activates the image sensor 14, the amplifier 22, the A/D converter 23, and the comparison/calculation circuit 27. The image sensor 14 converts the image of the document 11 into a corresponding electric signal. The output signal from the image sensor 14 which represents the image of the document 11 is enlarged by the amplifier 22 before being converted by the A/D converter 23 into a corresponding digital signal (detection data). The output data from the A/D converter 23 which represents the image of the document 11 has unwanted distortion components corresponding to the distortion of the optical system and the variation in characteristics (for example, sensitivities) between the photosensitive elements in the image sensor 14.

During the document image reading mode of operation, the comparison/calculation circuit 27 receives the detection data from the A/D converter 23. The comparison/calculation circuit 27 fetches the information of the data correcting function from the memory 26. The comparison/calculation circuit 27 processes the detection data into corrected data (correction-resultant data) pixel by pixel according to calculation determined by the data correcting function. During this processing, the distortion components are removed from the detection data. The corrected data is outputted from the comparison/calculation circuit 27 to an external device (not shown).

It is preferable that the comparison/calculation circuit 27 subjects the correction-resultant data to further processing of various types, such as halftone processing, enlarging/contracting, and binary encoding.

It is also preferable that at least one of the comparison/calculation circuits 25 and 27 detects the maximum value (for example, the maximum brightness) among the values represented by pixel-corresponding segments of the detection data, and compares the maximum value with a predetermined reference value. When the maximum value exceeds the reference value, the comparison/calculation circuit 25 or the comparison/calculation circuit 27 generates a digital signal representing a difference between the maximum value and the reference value. The digital signal is outputted to the D/A converter 28 from the comparison/calculation circuit 25 or 27 as a gain-control digital signal. The D/A converter 28 converts the gain-control digital signal into a corresponding analog control signal, and outputs the analog control signal to the amplifier 22 to reduce the gain of the amplifier 22.

The D/A converter 28 includes a switch responsive to whether a gain-control digital signal fed from the comparison/calculation circuit 25 or 27 is present or absent. In the absence of the feed of a gain-control digital signal to the D/A converter 28, the switch serves to hold a major part of the D/A converter 28 disconnected from the amplifier 22 so that the gain of the amplifier 22 remains unchanged. When a gain-control digital signal is fed to the D/A converter 28, the switch connects the major part of the D/A converter 28 to the amplifier 22 so that the gain of the amplifier 22 is adjusted in response to the gain-control digital signal.

Figure 4:
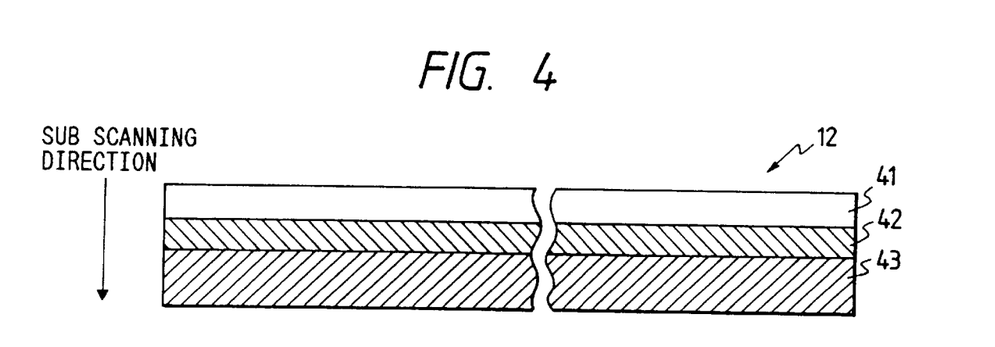
FIG. 4 is a plan view of a training plate in FIG. 1.

As shown in FIG. 4, the training plate 12 has a full white region 41, a full black region 42, and a hatched region 43 extending parallel with each other. Parallel lines extending in the hatched region 43 are inclined with respect to a horizontal or vertical direction at an angle of 45 degrees.

During the preliminary mode of operation, the full white region 41, the full black region 42, and the hatched region 43 are sequentially scanned by the image scanner.

The scanning of the white region 41 provides white references for shading correction which correspond to respective pixels in a line. During the scanning of the white region 41, a set of detection data Wn composing one line is stored into the memory 26 from the A/D converter 23 via the comparison/calculation circuit 25 where "n" denotes integers for identifying pixels in a line. The comparison/calculation circuit 25 selects the maximum value (the peak value) Wpk from among the values represented by the detection data Wn in the memory 26. The comparison/calculation circuit 25 compares the peak value Wpk with a predetermined reference value Wref, and calculates a difference between the peak value Wpk and the reference value Wref. The comparison/calculation circuit 25 controls the D/A converter 28 to adjust the gain of the amplifier 22 in response to the difference between the peak value Wpk and the reference value Wref so that a future corresponding peak value will be substantially equal to the reference value Wref.

During the scanning of the white region 41, after the control of the gain of the amplifier 22 has been completed, a set of detection data Wn composing one line is stored into the memory 26 from the A/D converter 23 via the comparison/calculation circuit 25 as white reference values for respective pixels in a line. The white reference values Wn compose information for shading correction (shading compensation). The information for shading correction constitutes a part of the previously-mentioned data correcting function.

The scanning of the white region 41 is sequentially followed by the scanning of the black region 42, the hatched region 43, and the document 11. After the scanning of the white region 41, the comparison/calculation circuit 25 or 27 subjects each pixel-corresponding detection data (first detection data) Xn to shading correction where "n" denotes an integer for identifying pixels in a line. Specifically, the comparison/calculation circuit 25 or 27 converts the first detection data Xn into second detection data (correction-resultant data) Yn pixel by pixel. The comparison/calculation circuit 25 or 27 calculates a second detection data value (a correction-resultant value) Yn by referring to the following equation.

$$Yn = M \cdot Xn/Wn \quad (1)$$

where M denotes a predetermined natural number equal to the total number of different tone levels, and Xn denotes the value represented by the first detection data corresponding to the pixel "n" and Wn denotes the white reference value corresponding to the pixel "n". The second detection data Yn is used as detection data subjected to later processing by the comparison/calculation circuits 25 and 27. The shading correction removes an unevenness in light quantity (light intensity) over the photodiode array 14A of the image sensor 14.

During at least one of the scanning of the black region 42 and the scanning of the hatched region 43, the comparison/calculation circuit 25 fetches the theoretical value data from the memory 24.

In addition, the comparison/calculation circuit 25 compares the detection data and the theoretical value data pixel by pixel, and generates information of a data correcting function in response to the comparison result. Basically, the data correction function corresponds to pixel-corresponding differences between the detection data and the theoretical value data which reflect the distortion components of the detection data. The comparison/calculation circuit 25 stores the information of the data correcting function into the memory 26.

Figure 5:
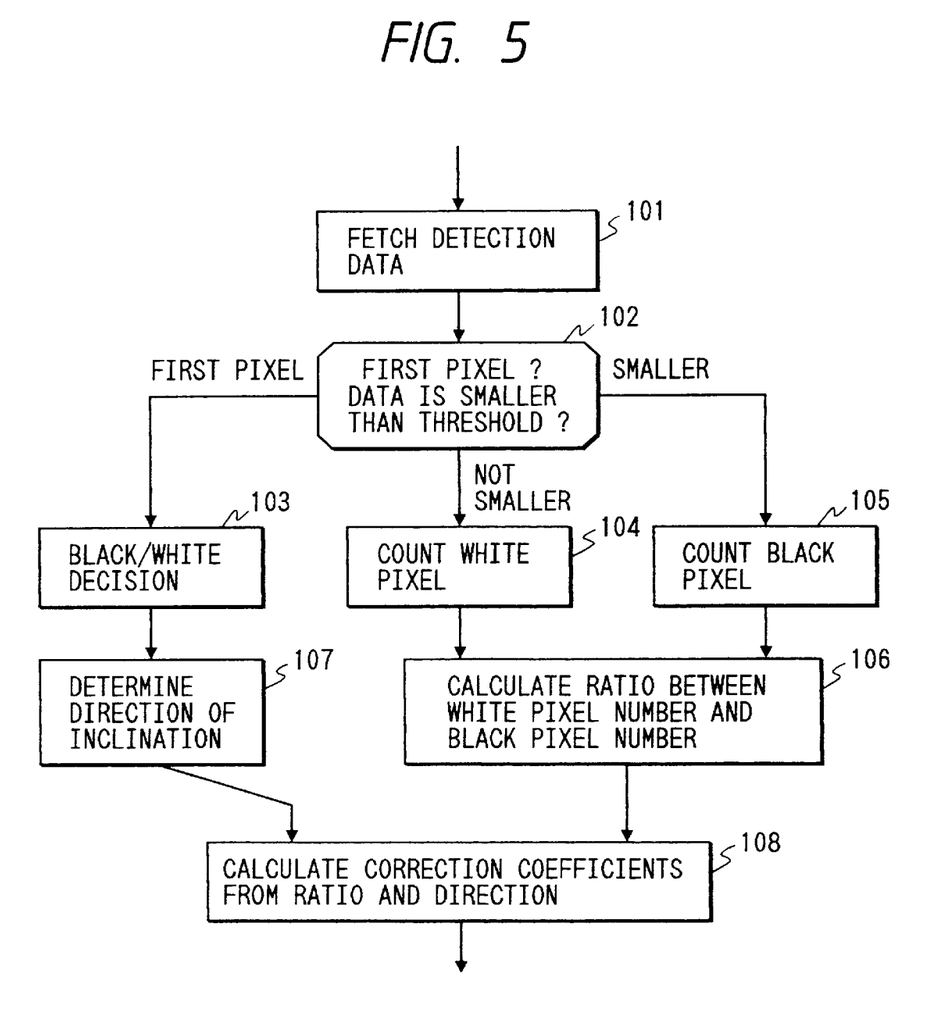
FIG. 5 is a flowchart of a program segment for controlling a comparison/calculation circuit in FIG. 3.

During the scanning of the white region 41 and the black region 42, the comparison/calculation circuit 25 detects the inclination of the training plate 12 with respect to a desired angular position by calculating the ratio between the number of white pixels and the number of black pixels in a given number of lines around the boundary between the white region 41 and the black region 42. In addition, the comparison/calculation circuit 25 calculates coefficients H for correcting the inclination of the training plate 12. FIG. 5 is a flowchart of a related program segment for controlling the comparison/calculation circuit 25. As shown in FIG. 5, a first step 101 of the program segment fetches the detection data. A step 102 following the step 101 decides whether or not the detection data corresponds to the first pixel in a line. When the detection data corresponds to the first pixel, the program advances from the step 102 to a step 103. In addition, the step 102 compares the value represented by the detection data with a predetermined threshold value. When the detection data value is equal to or greater than the threshold value, the program advances from the step 102 to a step 104. When the detection data value is smaller than the threshold value, the program advances from the step 102 to a step 105. The step 104 recognizes the current detection data as a white pixel, and the counts up the white pixel number. The step 105 recognizes the current detection data as a black pixel, and the counts up the black pixel number. A step 106 following the steps 104 and 105 calculates the ratio between the white pixel number and the black pixel number. The step 103 decides whether the first pixel corresponds to a white pixel or a black pixel. A step 107 following the step 103 determines the direction of the inclination in response to the result of the decision by the step 103. A step 108 following the steps 106 and 107 calculates the correction coefficients H from the ratio between the white pixel number and the black pixel number and the direction of the inclination. In addition, the step 108 stores information of the calculated correction coefficients H into the memory 26. The information of the correction coefficients H constitutes a part of the previously-mentioned data correcting function.

It is preferable that predetermined reference data representing different values of the correction coefficients H are previously stored in different-address segments of the memory 24 or 26 as a table. In this case, the step 108 executes the calculation of the correction coefficients H by referring to the table in the memory 24 or 26 according to a table look-up technique.

The correction coefficient H is determined pixel by pixel. During the calculation of the correction coefficients H, the comparison/calculation circuit 25 determines values "a", "b", "c", "d", "e", "f", "g", and "h" corresponding to respective pixels (m−1, n), (m, n−1), (m+1, n), (m, n+1), (m−1, n−1), (m+1, n−1), (m+1, n+1), and (m−1, n+1) in response to the ratio between the white pixel number and the black pixel number and the direction of the inclination, where "m" denotes an integer for identifying a line and "n" denotes an integer for identifying a pixel position in a line.

Thus, "m" and "n" indicate a pixel position in a two-dimensional plane. The pixels (m−1, n), (m, n−1), (m+1, n), (m, n+1), (m−1, n−1), (m+1, n−1), (m+1, n+1), and (m−1, n+1) neighbor and surround the pixel (m, n) of interest. The correction coefficient H for the pixel (m, n) of interest is denoted by the character H(m, n). The comparison/calculation circuit 25 calculates the correction coefficient H(m, n) from the values "a", "b", "c", "d", "e", "f", "g", and "h" and the values D(m−1, n), D(m, n−1), D(m+1, n), D(m, n+1), D(m−1, n−1), D(m+1, n−1), D(m+1, n+1), and D(m−1, n+1) of the detection data corresponding to the respective pixels (m−1, n), (m, n−1), (m+1, n), (m, n+1), (m−1, n−1), (m+1, n−1), (m+1, n+1), and (m−1, n+1) by referring to the following equation.

$$H(m,n) = a \cdot D(m-1,n) + b \cdot D(m,n-1) + c \cdot D(m+1,n) + \quad (2)$$
$$d \cdot D(m,n+1) + e \cdot D(m-1,n-1) + f \cdot D(m+1,n-1) +$$
$$g \cdot D(m+1,n+1) + h \cdot D(m-1,n+1)$$

The comparison/calculation circuit 25 stores information of the calculated correction coefficients H into the memory 26.

After the calculation of the correction coefficients H has been completed, the comparison/calculation circuit 25 detects the number of consecutive white pixels and compares the detected number of consecutive white pixels with a predetermined reference number. When the detected number of consecutive white pixels is equal to or greater than the reference number, the comparison/calculation circuit 25 recognizes a change from the scanning of the black region 42 to the scanning of the hatched region 43.

During the scanning of the hatched region 43 and the document 11, the comparison/calculation circuit 25 or 27 fetches the information of the correction coefficients H and processes the detection data into correction-resultant data in response to the correction coefficients H. Specifically, for the pixel (m, n) of interest, the comparison/calculation circuit 25 or 27 calculates the value D'(m, n) of the correction-resultant data from the value D(m, n) of the detection data and the correction coefficient H(m, n) by referring to the equation as "D'(m, n)=H(m, n)·D(m, n)".

Figure 6:
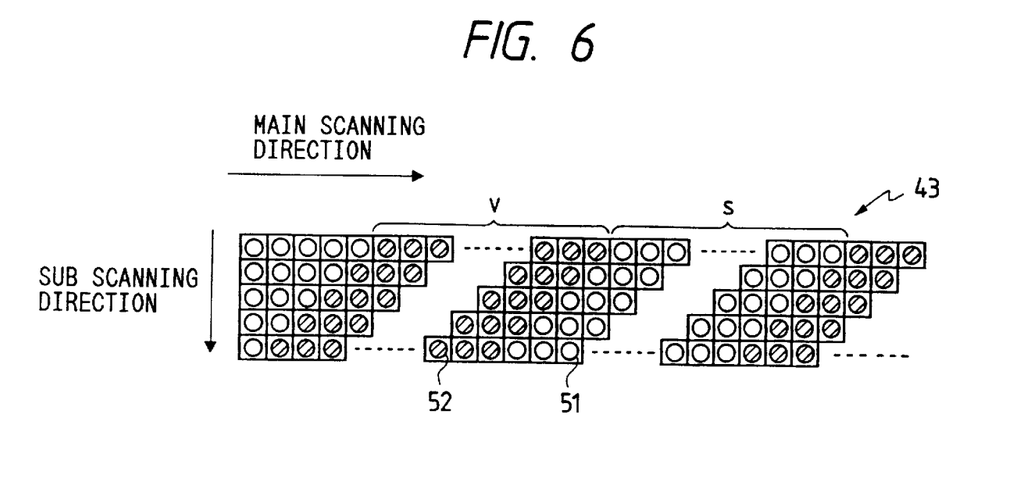
FIG. 6 is a diagram of a hatched region of the training plate in FIG. 4.

As shown in FIG. 6, each black line in the hatched region 43 is represented by a group of black pixels 52. Each black line has a dimension corresponding to "v" black pixels 52 along the main scanning direction. Black lines are spaced at equal intervals each corresponding to "s" white pixels 51 along the main scanning direction. As previously described, black lines are inclined at an angle of 45 degrees. Under ideal conditions free from a distortion and an inclination of the training plate 12, during the scanning of the hatched region 43 by (v+s) lines, every pixel on the image sensor 14 is temporarily subjected to a point of a change from a white pixel to a black pixel (a white-black change).

Figure 7:
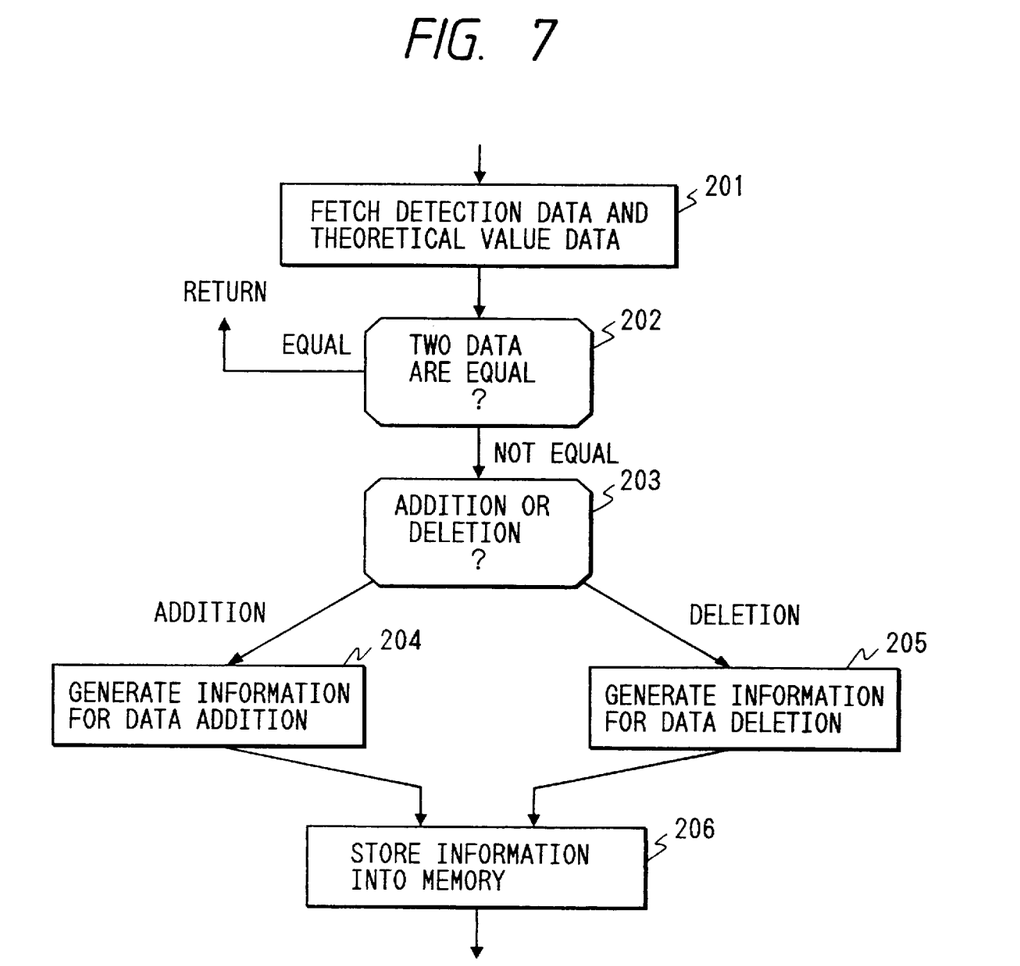
FIG. 7 is a flowchart of a program segment for controlling a comparison/calculation circuit in FIG. 3.

During the scanning of the hatched region 43, the comparison/calculation circuit 25 fetches the theoretical data value from the memory 24, and compares the detection data value and the theoretical data value pixel by pixel. By referring to the result of the comparison, the comparison/calculation circuit 25 detects whether or not intervals between points of white-black changes are substantially different from a value corresponding to H·(v+s) pixels. When intervals between points of white-black changes are substantially different from a value corresponding to H·(v+s) pixels, the comparison/calculation circuit 25 generates information of expanding/contracting correction. The information of expanding/contracting correction instructs addition or deletion of pixel-corresponding data to or from the detection data stream near a point of a white-black change or at a random in unit of (v+s) pixels. The comparison/calculation circuit 25 stores the information of expanding/contracting correction into the memory 26. The information of expanding/contracting correction constitutes a part of the previously-mentioned data correcting function. FIG. 7 is a flowchart of a related program segment for controlling the comparison/calculation circuit 25. As shown in FIG. 7, a first step 201 of the program segment fetches the detection data corresponding to the pixel "n" and also the theoretical value data corresponding to the pixel "n". A step 202 following the step 201 compares the detection data and the theoretical value data. When the detection data differs from the theoretical value data, the program advances from the step 202 to a step 203. When the detection data agrees with the theoretical value data, the current execution cycle of the program segment terminates. The step 203 counts pixels in a direction corresponding to a line in response to the detection data. The step 203 decides whether data addition or data deletion should be done in response to the counted number of pixels. When data addition should be done, the program advances from the step 203 to a step 204. When data deletion should be done, the program advances from the step 203 to a step 205. The step 204 modifies the detection data, and generates information of expanding correction which instructs addition of pixel-corresponding data to the detection data stream near a point of a white-black change.

The step 205 modifies the detection data, and generates information of contracting correction which instructs deletion of pixel-corresponding data from the detection data stream near a point of a white-black change. A step 206 following the steps 204 and 205 stores the information of expanding/contracting correction into the memory 26. The information of expanding/contracting correction contains information of the places of added and deleted data relative to a line.

The comparison/calculation circuit 25 generates information of correcting a resolution which constitutes a part of the previously-mentioned data correcting function. The resolution-correcting information is expressed as a spatial filter having the following parameters F(i, j).

$$F(i,j) = \begin{bmatrix} C & B & C \\ A & 1 - 2A - 2B - 4C & A \\ C & B & C \end{bmatrix} \quad (3)$$

where "i" denotes an integer for identifying a line and "j" denotes an integer for identifying a pixel position in a line; "i" and "j" indicate a pixel position in a two-dimensional plane; A denotes a coefficient of correction in the main scanning direction; B denotes a coefficient of correction in the sub scanning direction; and C denotes a coefficient of correction in directions oblique to the main scanning direction and the sub scanning direction. The comparison/calculation circuit 25 determines and updates the correction coefficients A, B, and C in response to the correcting information in the memory 26. Accordingly, each time the information of expanding/contracting correction is generated for data addition or data deletion, the correction coefficients A, B, and C are updated. The comparison/calculation circuit 25 stores the resolution-correcting information into the memory 26.

It is preferable that predetermined reference data representing different values of the correction coefficients A, B, and C are previously stored in different-address segments of the memory 24 or 26 as a table. In this case, the calculation of the correction coefficients A, B, and C is executed by referring to the table in the memory 24 or 26 according to a table look-up technique.

During the scanning of the document 11, the comparison/calculation circuit 27 fetches the resolution-correcting information from the memory 26. The comparison/calculation circuit 27 determines a value Dc(i, j) of correction-resultant data corresponding to the pixel (i, j) of interest in response to the spatial filter parameters F(i, j) and the values Do(i, j), Do(i, j−1), Do(i, j+1), Do(i−1, j), Do(i+1, j), Do(i−1, j−1), Do(i−1, j+1), Do(i+1, j−1), and Do(i+1, j+1) of the detection data corresponding to the pixel (i, j) of interest and neighboring pixels (i, j−1), (i, j+1), (i−1, j), (i+1, j), (i−1, j−1), (i−1, j+1), (i+1, j−1), and (i+1, j+1) by referring to the following equation.

$$\begin{aligned}Dc(i,j) = &(1 - 2A - 2B - 4C) \cdot Do(i,j) + \\ &A \cdot \{Do(i,j - 1) + Do(i,j + 1)\} + \\ &B \cdot \{Do(i - 1,j) + Do(i + 1,j)\} + \\ &C \cdot \{Do(i - 1,j - 1) + Do(i - 1,j + 1) + \\ &Do(i + 1,j - 1) + Do(i + 1,j + 1)\}\end{aligned} \quad (4)$$

DESCRIPTION OF THE SECOND PREFERRED EMBODIMENT

Figure 9:
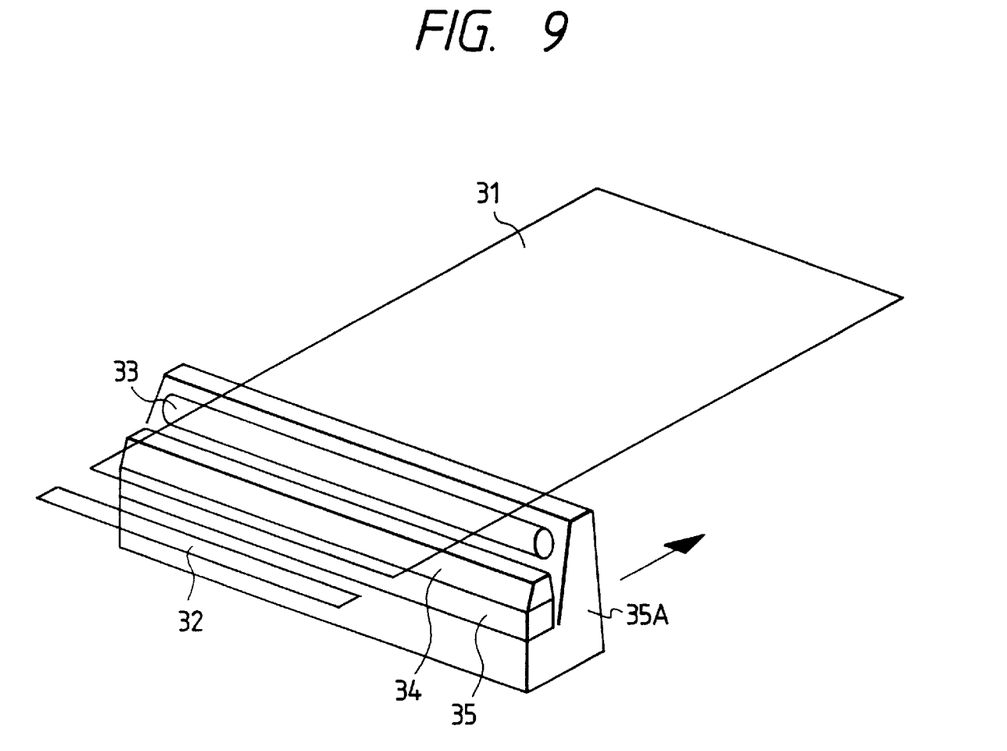
FIG. 9 is a perspective diagram of an image scanner according to a second embodiment of this invention.

FIG. 9 shows a second embodiment of this invention which is similar to the embodiment of FIGS. 1–8 except for design changes indicated later.

With reference to FIG. 9, an image scanner includes a light source 33, an optical system 34, and an image sensor 35. The image scanner serves to convert an image of a surface of a training plate 32 and an image of a surface of a document 31 into a corresponding electric signal. The image sensor 35 is similar to the image sensor 14 of FIG. 1. The document 31 and the training plate 32 are similar to the training plate 12 and the document 11 of FIG. 1.

The light source 33 includes a linear array of LED's. The light source 33 extends along the width of the document 31 and illuminates a linear region of the document 31 or the training plate 32. Light reflected from the illuminated region of the document 31 or the training plate 32 travels to the image sensor 35 via the optical system 34. The optical system 34 includes, for example, a rod array lens. The optical system 34 is designed so that an image formed on the image sensor 35 is neither enlarged nor contracted with respect the document 31. In other words, the optical system 34 has an effective magnification or reduction factor equal to unity.

The light source 33, the optical system 34, and the image sensor 35 compose a main portion of a sensor unit. The light source 33, the optical system 34, and the image sensor 35 are carried on a common drive member 35A. The light source 33, the optical system 34, and the image sensor 35 are moved relative to the document 31 and the training plate 32 in a longitudinal direction of the document 31 by a sub scanning mechanism including the drive member 35A. This movement enables the document 31 and the training plate 32 to be scanned in a sub scanning direction.

What is claimed is:

1. A corrected data generator comprising:

a training plate having a reference pattern;

a memory storing predetermined image information corresponding to the reference pattern on the training plate;

means for converting a light signal representative of either the reference pattern or an object into a corresponding electric signal;

means for automatically generating resolution corrective information in response to an electric signal of the reference pattern which is generated by the converting means, and in response to the image information stored in the memory; and means for automatically correcting a resolution related to an electric signal of the object, which is generated by the converting means, in response to the resolution corrective information generated by the generating means.

2. An apparatus comprising:

a member having a predetermined reference pattern;

an image sensor for converting an image of the reference pattern into a reference electric signal, and for converting an image of an object into an object electric signal;

a memory storing a predetermined electric signal representing an ideal image of the reference pattern;

means for automatically comparing the reference electric signal and the predetermined electric signal; and means for automatically correcting a resolution related to the object electric signal in response to a result of the comparing by the comparing means.

3. An apparatus in accordance with claim 2, wherein said means for correcting comprises resolution correcting means for correcting a resolution related to the object electric signal in response to said result of the comparing by said comparing means.

4. An apparatus in accordance with claim 2, wherein said means for correcting comprises brightness correcting means for correcting a brightness represented by the object electric signal in response to said result of the comparing by said comparing means.

5. An apparatus in accordance with claim 2, wherein said member comprises training plate means having said reference pattern thereon, said training plate means being on a common plane with the object and spaced therefrom.

6. An apparatus in accordance with claim 5, wherein said training plate means comprises a full white region, a full black region, and a hatched region for sequential sensing by said image sensor to form said reference electric signal.

7. An apparatus in accordance with claim 2, wherein said member comprises training plate means having said reference pattern thereon, said image sensor comprises scanning means for scanning the object in a predetermined scanning direction, and said training plate means has a width dimension substantially identical to a width dimension of the object in said scanning direction.

8. An apparatus in accordance with claim 7, wherein said training plate means comprises a full white region, a full black region, and a hatched region for sequential scanning by said scanning means to form said reference electric signal.

9. An apparatus in accordance with claim 8, wherein said training plate means being on a common plane with the object and uniformly spaced therefrom.

10. An apparatus comprising:

a member having a predetermined reference pattern;

an image sensor for converting an image of the reference pattern into a reference electric signal, and for converting an image of an object into an object electric signal;

a memory storing a predetermined electric signal representing an ideal image of the reference pattern;

means for automatically generating a resolution corrective electric signal in response to the reference electric signal and the predetermined electric signal; and means for automatically correcting a resolution related to the object electric signal in response to the resolution corrective electric signal.

* * * * *